May 6, 1930.  H. A. TUTTLE  1,757,027
CLUTCH MECHANISM
Filed April 4, 1927  2 Sheets-Sheet 1
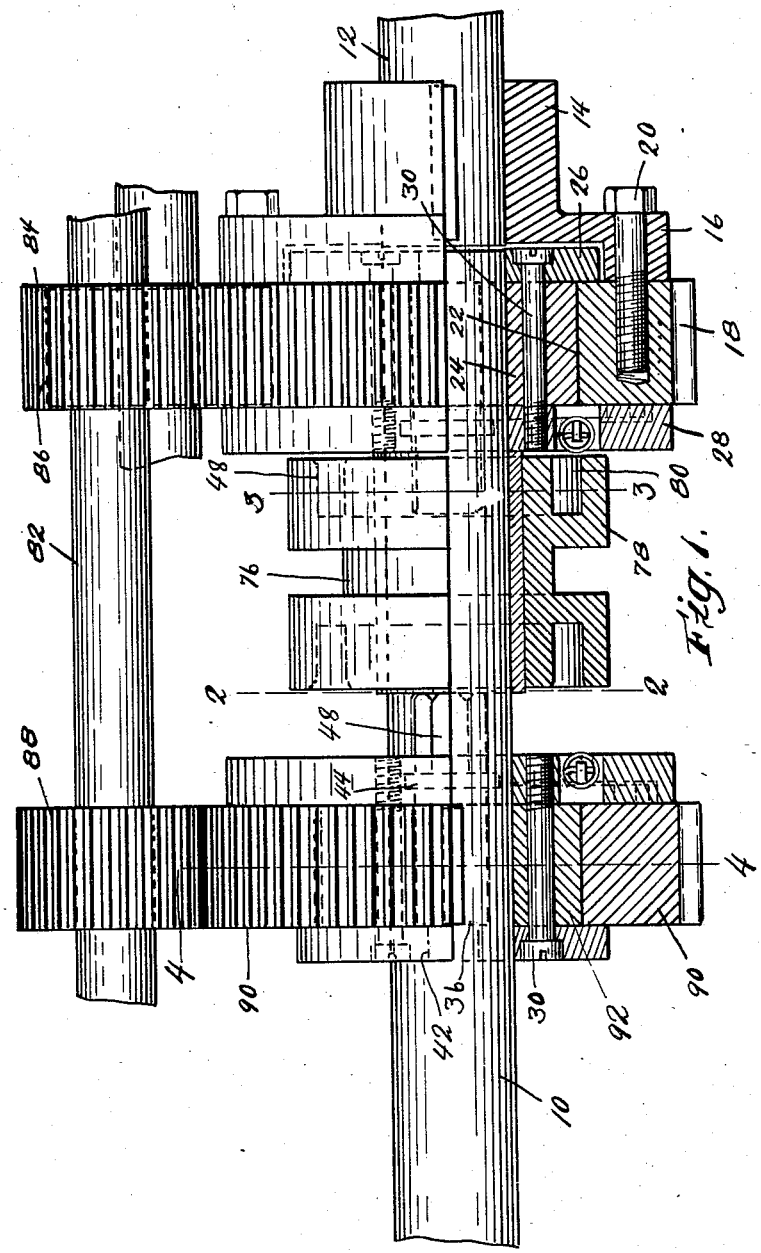

May 6, 1930.  H. A. TUTTLE  1,757,027
CLUTCH MECHANISM
Filed April 4, 1927   2 Sheets-Sheet 2
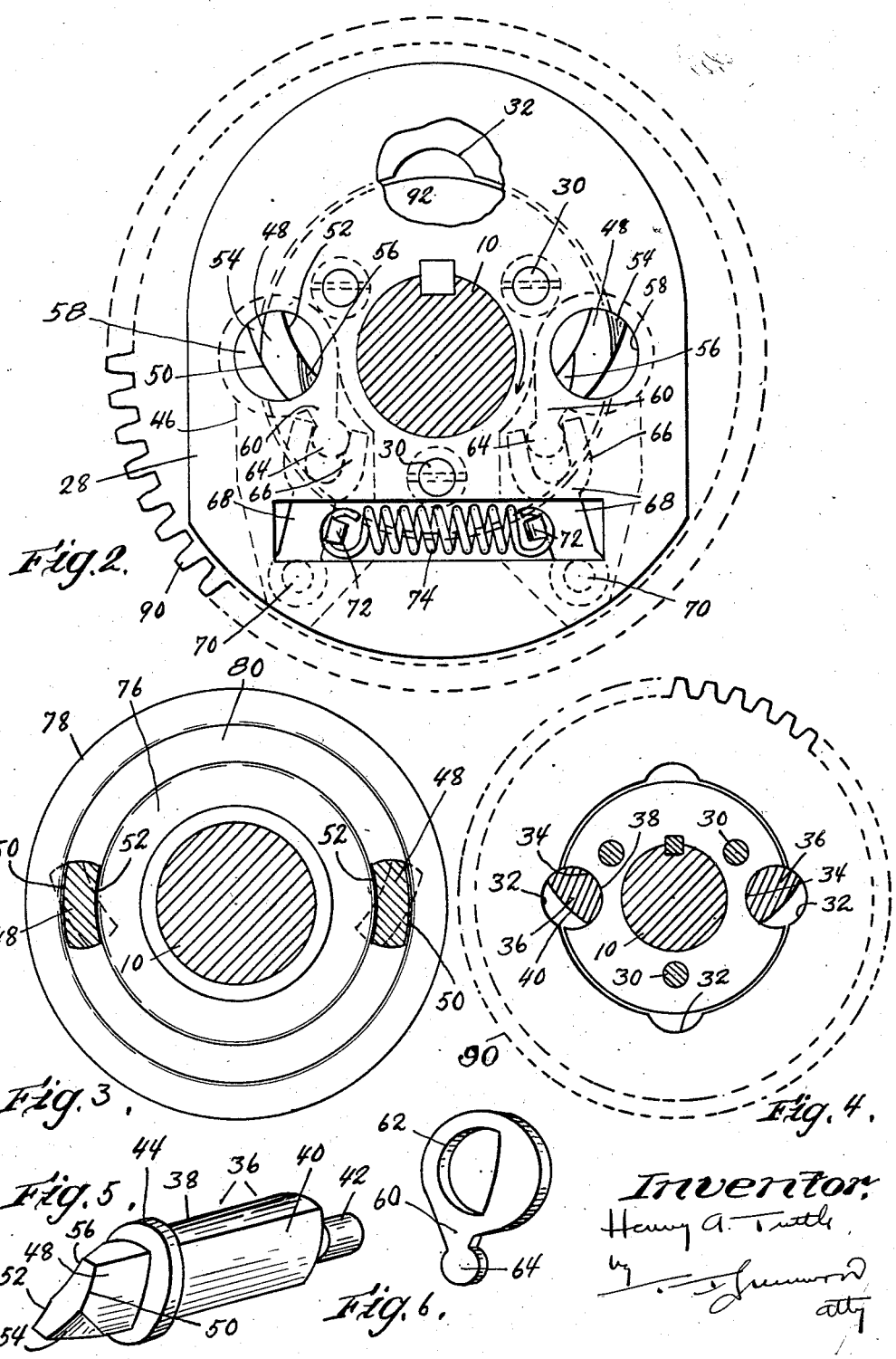

Patented May 6, 1930

1,757,027

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

CLUTCH MECHANISM

Application filed April 4, 1927. Serial No. 180,703.

This invention relates to gearing mechanism of the type having clutch mechanism to connect the driving and driven shafts directly together for forward drive and gearing including a second clutch mechanism controlling the gearing to connect said shafts together for the reverse drive of the driven shaft. The gearing mechanism is particularly applicable, although not necessarily limited, to marine propulsion.

The gearing mechanism associated with this invention is of the general type disclosed in my co-pending application Serial No. 180,702, filed April 4, 1927.

This particular invention relates to and has as an object a novel and desirable form of clutch mechanism for connecting a driving member and a driven member positively together, as the driving and driven shafts, or the driven and driving members, of the gearing.

A further object of the invention is the provision of a simple and inexpensive, strong and durable clutch mechanism.

A yet further object of the invention is generally to improve the construction and operation of clutch mechanisms.

Fig. 1 is a side elevation partly in section of a gearing mechanism embodying the invention with parts not essential to the mechanism omitted.

Fig. 2 is a view along line 2—2 of Fig. 1.

Fig. 3 is a view along line 3—3 of Fig. 1, the section lines being omitted from some of the parts, for clearness.

Fig. 4 is a view along line 4—4 of Fig. 1, the section lines being omitted from some of the parts, for clearness.

Fig. 5 is a perspective view of one of the clutch pins or keys.

Fig. 6 is a perspective view of one of the arms of the clutch pins or keys.

The gearing mechanism associated with this invention includes a driving shaft 10 and a driven shaft 12 which is aligned with said driving shaft. A hub 14 is keyed to said driven shaft and is provided with a radially outstanding flange 16 to which a spur gear 18 is fixed by bolts 20. Said gear is hollow or is provided with an annular passage 22 therein. A cylinder or collar 24 is keyed to the end of said driving shaft and fits closely within said passage. Said cylinder is provided with outstanding cover plates 26 and 28 respectively which overlie the opposite faces of said gear to prevent relative displacement of said cylinder and gear. Said cover plates are fixed to said cylinder 24 by screws 30. Said cylinder 24 and gear 18 form driving and driven members of a clutch mechanism and are adapted to be positively connected together to drive said driving and driven shafts conjointly for rotation in the same direction.

The passage or recess in said gear 18 is formed or provided with a plurality of arcuate-shaped recesses 32 therein, see Figs. 2 and 4. Said cylinder 24 is provided with a plurality of rocking clutch pins that have projections or shoulders that are adapted to enter said recesses 32 and connect said cylinder and gear positively together.

Each clutch pin is received within an arcuate recess 34 in said cylinder 24 and the arcuate recesses of said cylinder, when aligned with the arcuate recesses 32 in said gear, permit said rocking pins to enter the recesses 32 and thereby to connect the cylinder and gear positively together.

The rocking pins or keys are or may be identical and but one will be described. The rocking pin is illustrated in Fig. 5 and comprises a body portion 36 which has a cylindrical bottom face 38 that is adapted snugly to fill the recess 34 in said cylinder. The upper face 40 of said body portion is curved to conform with the outer periphery of said cylinder. Said key is provided with a cylindrical extension 42 that is journalled in an aperture of the corresponding size formed in said plate 26. Said locking key is also provided at the end remote from said cylindrical extension 42 with an integral cylindrical flange 44 which is adapted to be journalled within a corresponding recess in the inner face of said cover plate 28. Said key is also provided with an extension 48 which extends forwardly of said flange 44. Said extension is formed with the outer and inner concentric arcuate faces 50 and 52 respectively. The outer face 50 for the specific construction here shown is in effect a continuation of the arcuate face 40. The upper edge of said arcuate face 50 is chamfered off at one side as at 54 and the arcuate face 52 is chamfered off at the other side as at 56 for the purpose of effecting the rotation of said key in a manner hereinafter to be explained. Said keys are received rotatably in the recesses 34 in said cylinder and are held therein against lateral displacement by the cover plates 26 and 28. The extensions 48 of said keys are extended freely through apertures 58 in said cover plate 28 in positions to be engaged by suitable operating mechanism. Said keys are adapted normally to be constantly urged for rotation in a direction to enter the notches 32 in said gear and thereby to clutch the gear and cylinder together. To this end, each clutch key is secured to an arm 60 which is formed at one end with a disc having an arcuate slot 62 therein in which the body portion 36 of the rocking key is adapted to be received. Said disc is adapted to lie against the flange 44. The lower end of said arm is provided with an enlarged cylindrical section or button 64. The buttons of both arms are adapted to lie between the spaced arms 66 of spaced levers 68 which are pivoted at 70 to the lower portion of and lie in recesses in the inner face of the cover plate 28. Said levers 68 are provided with upstanding projections 72 near their inner ends and a tension spring 74, occupying an elongated opening in the cover plate, is extended therebetween and serves to normally urge said levers constantly toward the position shown in Figs. 2 and 4, wherein the locking keys are in locking engagement with the gear.

The clutch operating mechanism for controlling the rotation of said locking keys includes a sleeve 76 which is carried by and is loose on and is freely slidable axially along the driving shaft 10. Said sleeve is provided with an outstanding flange 78 formed with an annular groove 80 therein that extends axially of the driving shaft. The outer diameter of said groove is approximately equal to that of the cylinder 24. The extensions 48 of said locking keys are adapted to enter said groove 80 when the sleeve is moved toward the right of Fig. 1. During such movement of the sleeve, and because of the chamfered portions 54 and 56 of the extensions 48, said keys are caused to be rotated about their axes into a position wherein they are withdrawn from the recesses 32 of said gear and thereby are free from driving connection with the gear; and the clutch consequently is in disengaged position.

When said sleeve 76 is moved in the opposite direction, it releases the keys and the spring 74, through its associated levers, effects the rotation of said keys into the recesses 32 of the gear when the keys and recesses are moved into alignment, thereby positively connecting the driving and driven elements of the clutch.

The clutch above described is adapted to connect the driving and driven shafts for conjoint rotation in the same direction. Gearing is provided to connect the shafts for the reverse rotation of the driven shaft. Said gearing includes a transmission shaft 82 which is parallel with said driving and driven shafts. A gear 84 is fixed to said transmission shaft in line with the gear 18 of said driven shaft and is in mesh with a reversing gear 86, which reversing gear is also in mesh with said gear 18 whereby reverse drive of the driven shaft is provided when the power drive is through the transmission shaft.

A gear 88 is fixed to said transmission shaft and is in constant mesh with a gear 90 which is loose on the driving shaft. A cylinder 92 is fixed to the driving shaft and clutch mechanism, identical with the clutch mechanism above described, is adapted to connect said cylinder and gear 90 positively together to effect the reverse rotation of the driven shaft. The sleeve 76 is adapted to control the two mechanisms conjointly so that one clutch mechanism is engaged while the other is disengaged and, in the mid position of the sleeve, both clutch mechanisms are adapted to be disengaged so that the gearing mechanism is in neutral or the driving and driven shafts are free from positive driving connection.

I claim:

1. Clutch mechanism comprising the combination of a driving member, a driven member, a pair of rocking keys carried by one of said members adapted to engage abutments of said other member and lock both members for conjoint rotation, means common to both keys constantly urging them for movement toward the aforesaid relation, and clutch-operating means comprising a sliding sleeve independently engageable with said keys to hold both of them out of locking position at the same time and also to release them for locking movement under action of said urging means.

2. Clutch mechanism comprising the combination of a driving member, a driven member, a pair of rocking keys carried by one of said members adapted to engage abutments of said other member and lock both members for conjoint rotation, said keys having exposed extensions which extend in opposite directions beyond the rocking axes of said keys, and a clutch operating member having a continuous annular key-rotating groove adapted to be entered by said extensions and to rotate said keys whereby to move them away from locking position and hold them positively against rotary movement in either direction.

3. Clutch mechanism comprising the combination of a cylindrical driving member, an annular driven member loosely surrounding said driving member and having recesses therein, rocking keys carried by said driving member adapted to enter said recesses and clutch both members together, clutch-operating means including means to hold all of said keys at the same time out of clutching position, and means common to and including a spring extended between both keys constantly urging them toward clutching position.

4. Clutch mechanism comprising the combination of driving and driven members, rocking keys adapted to connect said members for conjoint rotation, said keys having laterally-extended arms, pivoted levers having combined pivotal and sliding connections with said arms and resilient means acting on said levers to move said keys into clutch-engaging position.

5. Clutch mechanism comprising the combination of driving and driven members, rocking keys adapted to connect said members for conjoint rotation, said keys having laterally-extended arms, pivoted levers having combined pivotal and sliding connections with said arms, and resilient means extended between said levers to urge said keys into clutch-engaging position.

6. Clutch mechanism comprising the combination of driving and driven members, rocking keys adapted to connect said members for conjoint rotation and each characterized by having a non-cylindrical configuration which is adapted to be engaged by said driving and driven members, arms having corresponding non-cylindrical apertures received on such non-cylindrical configuration of said keys in locking connection therewith and clutch operating mechanism operating on said arms.

7. Clutch mechanism comprising the combination of driving and driven members, rocking keys adapted to connect said members for conjoint rotation and each characterized by having a non-cylindrical configuration terminated in an outstanding flange, arms having corresponding non-cylindrical apertures received on such non-cylindrical configuration of said keys in locking connection therewith and against said flanges, and clutch operating mechanism acting on said arms.

8. Clutch mechanism comprising the combination of driving and driven members, a rotatable key connecting said members for conjoint rotation having an extension provided with concentric arcuate faces, and clutch operating mechanism for rotating said key and for holding it against rotation in either direction comprising a sliding sleeve having an annular groove in which said key and extension can enter, the opposite annular walls of said groove engaging the arcuate faces of said extension and holding the key positively against rotation in either direction.

9. Clutch mechanism comprising the combination of a cylindrical driving member, an annular driven member loosely surrounding said driving member and having locking recesses therein, rocking keys carried loosely by said driving member having abutments adapted to enter said recesses and clutch said driving and driven members together, a cover plate fixed to said driving member and overlying said driven member and keys, said keys having laterally-extended arms, levers pivoted to said cover plate and having connections with said arms, and clutch operating mechanism operable on said arms.

10. Clutch mechanism comprising the combination of a cylindrical driving member, an annular driven member loosely surrounding said driving member and having locking recesses therein, rocking keys carried loosely by said driving member having abutments adapted to enter said recesses and clutch said driving and driven members together, a cover plate fixed to said driving member and overlying said driven member and keys, said keys having laterally-extended arms, levers pivoted to said cover plate and having connections with said arms, and a tension spring extended between and connected with said arms.

11. Clutch mechanism comprising the combination of a cylindrical driving member, an annular driven member loosely surrounding said driving member and having locking recesses therein, rocking keys carried loosely by said driving member having abutments adapted to enter said recesses and clutch said driving and driven members together, a cover plate fixed to said driving member and overlying said driven member and keys, said keys having laterally-extended arms, levers pivoted to said cover plate and having connections with said arms, said keys having extensions projecting through apertures in said cover plate, and clutch operating mechanism operable on said extensions.

12. Clutch mechanism comprising driving and driven members, a rocking key rotatable in opposite directions into and out of locking engagement with said members, said key having oppositely-inclined cam surfaces at one end, a member movable axially into engagement with said key to rotate said key in one direction having an annular groove opposed to and adapted to be entered by the end of said key, which member, at said annular groove, is arranged to engage said cam surfaces of and rotate the key, and other means to rotate said key in the opposite direction.

13. Clutch mechanism comprising driving and driven members, a rocking key rotatable in opposite directions into and out of locking engagement with said members, said key having oppositely-inclined cam surfaces at one end, a member movable axially into engagement with said cam surfaces to rotate said key in one direction having an annular groove opposed to and adapted to be entered by the end of said key, which member, at said annular groove, is arranged to engage said cam surfaces of and rotate the key, and a spring to rotate said key in the opposite direction.

14. In a gearing mechanism, a driving shaft, a cylinder fixed thereon, a gear surrounding and freely rotatable about said cylinder, cover plates detachably fixed to one of the aforesaid members and disposed on opposite sides of and closely adjacent to said cylinder and gear, whereby to hold said gear against axial movement on said shaft, and clutch mechanism connecting said cylinder and gear including rotatable clutch dogs pivotally supported in at least one of said plates and each having an actuating member extended outwardly therebeyond, spring means external of said gear acting on each of said dogs to rotate them in one direction, and an axially movable sleeve engageable at the same time with both of said actuating members for rotating said dogs together in the opposite direction.

15. In a gearing mechanism, the combination of a driving shaft, clutch members one of which comprises a cylinder on said shaft provided with an axially-extended peripheral recess and the other of which comprises an annular member closely surrounding said cylinder and having an axially extended peripheral recess, cover plates fixed to one of said clutch members on opposite sides of both of said members, a clutch dog pivotally connected with one of said clutch members in the recess thereof between said cover plates adapted to enter the recess in the other clutch member, whereby to connect said cylinder and annular member for conjoint rotation, spring means urging said clutch dog for movement in the aforesaid direction, said clutch dog having an axial extension loosely extended through an opening in one of said cover plates, and clutch operating mechanism including a sleeve slidable on said shaft in a direction to engage said dog-extension and move said dog between clutching and free positions.

16. In a gearing mechanism, a driving shaft, a cylinder fixed thereon, a gear surrounding and freely rotatable about said cylinder, cover plates fixed to said cylinder on opposite sides of and closely adjacent to said gear, whereby to hold said gear against axial movement on said cylinder, and clutch mechanism connecting and located between said gear and cylinder and including clutch dogs carried by and having rocking connections with said cylinder and at least one of said cover plates, both dogs having actuating extensions extended outwardly beyond said cover plates, and a sliding sleeve separably engageable at the same time with both extensions for positively rotating said dogs.

In testimony whereof, I have signed my name to this specification.

HENRY A. TUTTLE.